US009402264B2

(12) United States Patent
Zhu et al.

(10) Patent No.: US 9,402,264 B2
(45) Date of Patent: Jul. 26, 2016

(54) METHODS TO TRANSPORT INTERNET TRAFFIC OVER MULTIPLE WIRELESS NETWORKS SIMULTANEOUSLY

(75) Inventors: Jing Zhu, Portland, OR (US); Rath Vannithamby, Portland, OR (US); Longcheng Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 13/995,154

(22) PCT Filed: Mar. 29, 2012

(86) PCT No.: PCT/US2012/031145
§ 371 (c)(1),
(2), (4) Date: Jun. 17, 2013

(87) PCT Pub. No.: WO2013/048567
PCT Pub. Date: Apr. 4, 2013

(65) Prior Publication Data
US 2013/0268628 A1 Oct. 10, 2013

Related U.S. Application Data

(60) Provisional application No. 61/542,086, filed on Sep. 30, 2011.

(51) Int. Cl.
*G06F 15/16* (2006.01)
*H04W 72/12* (2009.01)
(Continued)

(52) U.S. Cl.
CPC ......... *H04W 72/1215* (2013.01); *H04B 7/0456* (2013.01); *H04B 7/0615* (2013.01); *H04B 7/0619* (2013.01); *H04L 5/0032* (2013.01);
(Continued)

(58) Field of Classification Search
None
See application file for complete search history.

(56) References Cited

U.S. PATENT DOCUMENTS

2006/0133309 A1* 6/2006 Mathis et al. ................ 370/328
2007/0014260 A1* 1/2007 Seo .............................. 370/331
(Continued)

FOREIGN PATENT DOCUMENTS

WO 2008/137132 A2 11/2008
WO 2008/137132 A3 11/2008
(Continued)

OTHER PUBLICATIONS

International Search Report and Written opinion for PCT Patent Application No. PCT/US2012/031145, mailed Oct. 23, 2012, 9 pages.
(Continued)

*Primary Examiner* — Joshua Joo
(74) *Attorney, Agent, or Firm* — Alpine Technology Law Group LLC

(57) ABSTRACT

A wireless communication device includes at least two transceivers and a processor. A respectively selected portion of a downlink and uplink data flow signals is transmitted to and received from corresponding different wireless networks. The uplink and downlink data flow signals comprise data flows between a client entity and an Internet-Protocol-based services application. In one embodiment, the selected portions of the uplink and downlink are based on consecutively arranged packets communicated over respectively different wireless networks. In another embodiment, the selected portions of the uplink and downlink are based on relative packet sizes.

27 Claims, 8 Drawing Sheets

(51) Int. Cl.

| | |
|---|---|
| *H04W 48/16* | (2009.01) |
| *H04B 7/06* | (2006.01) |
| *H04B 7/04* | (2006.01) |
| *H04W 52/02* | (2009.01) |
| *H04L 12/891* | (2013.01) |
| *H04W 52/04* | (2009.01) |
| *H04L 5/00* | (2006.01) |
| *H04W 72/04* | (2009.01) |
| *H04W 4/08* | (2009.01) |
| *H04W 36/00* | (2009.01) |
| *H04W 28/04* | (2009.01) |
| *H04W 4/06* | (2009.01) |
| *H04W 72/00* | (2009.01) |
| *H04W 76/04* | (2009.01) |
| *H04L 12/709* | (2013.01) |
| *H04W 48/18* | (2009.01) |
| *H04W 72/08* | (2009.01) |
| *H04W 84/04* | (2009.01) |
| *H04W 52/54* | (2009.01) |
| *H04L 12/18* | (2006.01) |
| *H04L 25/02* | (2006.01) |
| *H04W 28/10* | (2009.01) |
| *H04W 52/24* | (2009.01) |
| *H04W 52/36* | (2009.01) |
| *H04W 48/12* | (2009.01) |

(52) U.S. Cl.
CPC ............ *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 72/005* (2013.01); *H04W 72/042* (2013.01); *H04W 72/082* (2013.01); *H04W 72/1278* (2013.01); *H04W 72/1294* (2013.01); *H04W 76/048* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02B 60/50* (2013.01)

(56) References Cited

U.S. PATENT DOCUMENTS

| | | | |
|---|---|---|---|
| 2007/0036106 A1* | 2/2007 | Karl | H04L 47/125 370/331 |
| 2007/0116012 A1 | 5/2007 | Chang et al. | |
| 2008/0205549 A1 | 8/2008 | Rofougaran | |
| 2009/0013363 A1* | 1/2009 | Lee et al. | 725/110 |
| 2009/0190524 A1* | 7/2009 | Liu et al. | 370/328 |
| 2010/0046474 A1* | 2/2010 | Kozakai et al. | 370/331 |
| 2010/0062801 A1 | 3/2010 | Kim et al. | |
| 2010/0313125 A1* | 12/2010 | Fleizach et al. | 715/702 |
| 2012/0320751 A1 | 12/2012 | Zhu | |
| 2013/0021169 A1* | 1/2013 | Soomro et al. | 340/870.02 |

FOREIGN PATENT DOCUMENTS

| | | |
|---|---|---|
| WO | 2010/108144 A1 | 9/2010 |
| WO | 2013/048567 A1 | 4/2013 |

OTHER PUBLICATIONS

International Preliminary Report on Patentability and Written Opinion received for PCT Patent Application No. PCT/US2012/031145, mailed on Apr. 10, 2014, 6 pages.

Extended European Search Report received for European Patent Application No. 12834751.5, mailed on Jul. 13, 2015, 9 pages.

Hsieh, et al., "A Transport Layer Approach for Achieving Aggregate Bandwidths on Multi-Homed Mobile Hosts", The Journal of Mobile Communication, Computation and Information, Jan. 1, 2005, pp. 99-114, vol. 11, No. 1-2, Kluwer Academic Publishers, The Netherlands.

Habib, et al. "Taking Advantage of Multihoming with Session Layer Striping", Proceedings, Apr. 1, 2006, pp. 1-6, IEEE, Piscataway, NJ.

3rd Generation Partnership Project, "IP flow mobility and seamless Wireless Local Area Network (WLAN) offload; Stage 2", 3GPP TS 23.261 V10.1.0, Sep. 29, 2010, 22 pages.

3rd Generation Partnership Project, Access Network Discovery and Selection Function (ANDSF) Management Object (MO), 3GPP TS 24.312 V11.0.0, Sep. 28, 2011, 157 pages.

Internet Engineering Task Force, "Multiple Care-of Address Registration", Request for Comments 5648, Oct. 2009, 36 pages.

Internet Engineering Task Force, "Flow Bindings in Mobile IPv6 and Network Mobility (NEMO) Basic Support", Request for Comments 6089, 31 pages.

\* cited by examiner

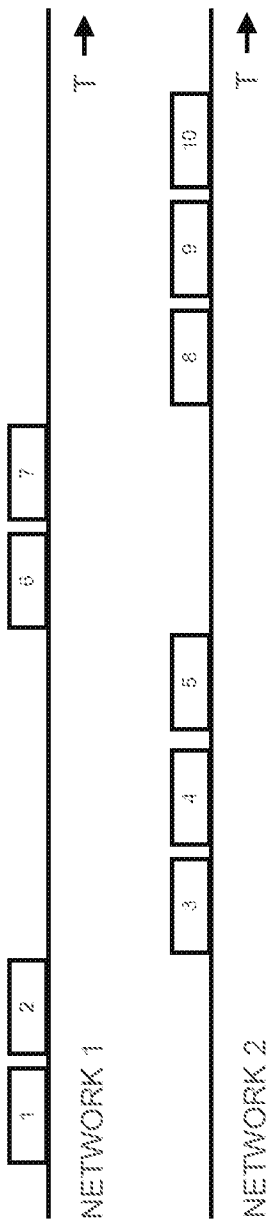
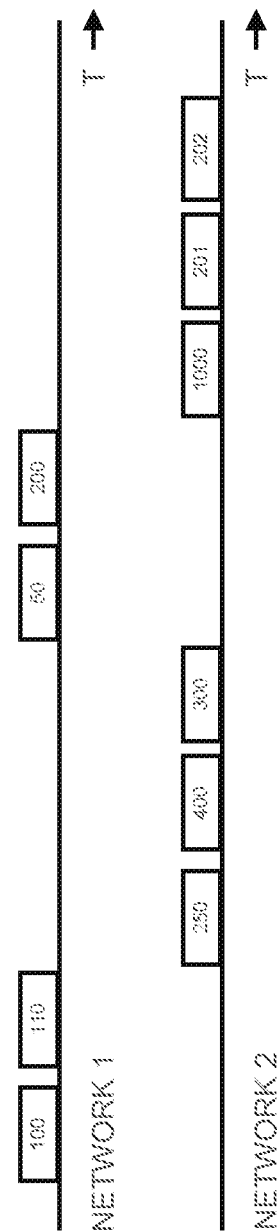
FIG. 2
FIG. 3

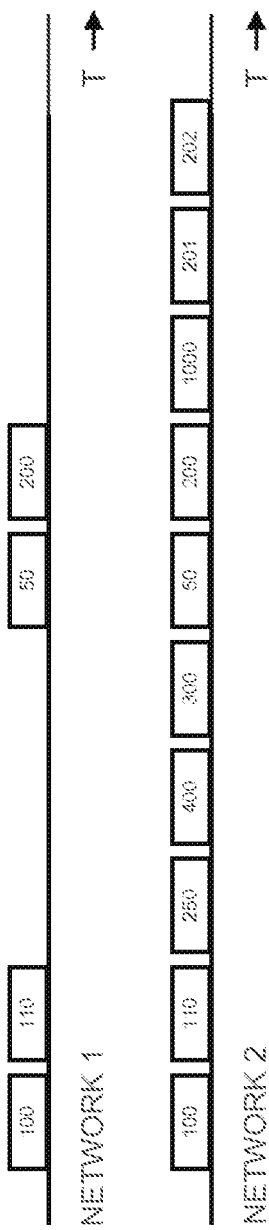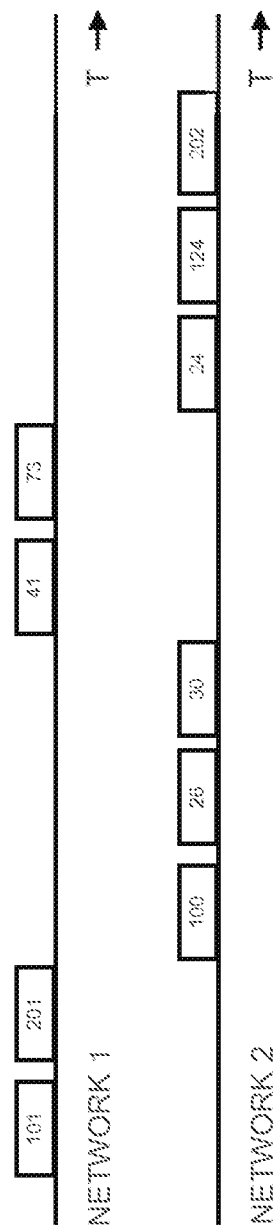

METHODS TO TRANSPORT INTERNET TRAFFIC OVER MULTIPLE WIRELESS NETWORKS SIMULTANEOUSLY

TECHNICAL FIELD

Embodiments described herein are generally directed to the field of wireless communications.

BACKGROUND ART

A mobile client, such as laptop, smart phone, etc., is increasingly equipped with radios for simultaneously accessing each of a Wireless Local Area Network (WLAN) (e.g., Wi-Fi) and a Wide Wireless Area Network (WWAN) (e.g., 2G/3G cellular, LTE, WiMAX). It is important the most "suitable" network for an IP packet flow is selected when both types of networks are available. The process for selecting the most suitable network if both types of networks are available is referred to as an IP Flow Mobility technique. Conventional techniques for IP Flow Mobility are set forth in 3GPP TS 23.261 v1.0.1.0 $3^{rd}$ Generation Partnership Project; Technical Specification Group Services and System Aspects; IP Flow mobility and seamless Wireless Local Access (WLAN) offload; Stage 2 (Release 10), and in RFC 6089—Flow Bindings in Mobile IPv6 and Network Mobility (NEMO) Basic Support.

A conventional IP Flow Mobility technique, however, only provides for moving a particular IP flow from Wln to WWAN, and vice versa, but does not support delivering a single IP flow over multiple networks simultaneously. As used herein, a "single IP flow" or a "single data flow" means a set of IP packets that can be classified into the same group based on the Traffic Selector information, such as Source IP address, Destination IP address, Protocol Type, Source Port Number, Destination Port Number, as set forth in RFC 6088—Traffic Selectors For Flow Bindings. That is, a conventional IP Flow Mobility technique does not provide the capability to split an individual IP flow between multiple available wireless networks in order to provide an enhanced user experience, such as by providing a higher aggregate throughput. What is needed is a technique for splitting an individual IP flow between multiple wireless networks.

BRIEF DESCRIPTION OF THE DRAWINGS

Embodiments disclosed herein are illustrated by way of example, and not by way of limitation, in the figures of the accompanying drawings in which like reference numerals refer to similar elements and in which:

FIG. 2 depicts an exemplary Mode 1 IP Intra-Flow Mobility for N=2 available networks as a function of time T According to the subject matter disclosed herein;

FIG. 3 depicts an exemplary Mode 2 IP Intra-Flow Mobility for N=2 available networks as a function of time T according to the subject matter disclosed herein;

FIG. 4 depicts an exemplary Mode 2 IP intra-Flow Mobility as a function of time T for N=2 available networks according to the subject matter disclosed herein;

FIG. 5 depicts how the parameter p3 is used by Mode 2 IP Intra-flow Mobility according to the subject matter disclosed herein;

Figure 1:
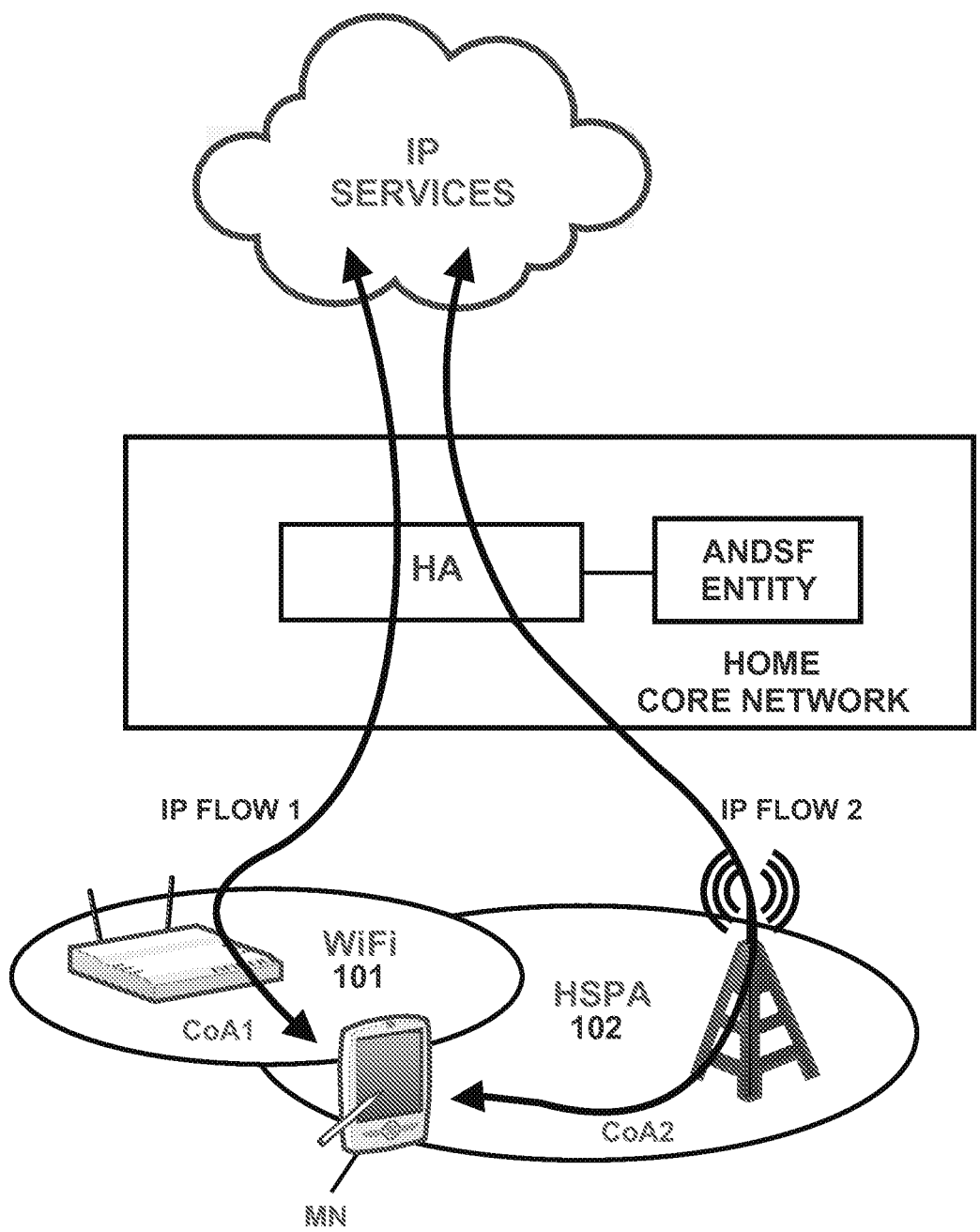
FIG. 1 depicts an exemplary multiple network configuration in which a mobile client MN can simultaneously access a WLAN 101 and a WWAN 102, and control an IP Intra-Flow Mobility according to the subject matter disclosed herein.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Conventional communication techniques do not provide for splitting an individual IP flow between multiple wireless networks.

The subject matter disclosed herein provides three IP Intra-Flow Mobility techniques for splitting an individual IP flow between multiple wireless networks. The first technique, referred to herein as Mode 1 (or Type 1), utilizes a sequence-based flow-splitting technique. The second technique, referred to herein as Mode 2 (or Type 2), utilizes a size-based flow-splitting technique. The third technique, referred to herein as Mode 3 (or Type 3), utilizes an implicit flow-splitting technique.

The subject matter disclosed herein provides the capability to split an individual IP flow between multiple available wireless networks in order to provide an enhanced user experience, such as by providing a higher aggregate throughput.

Embodiments of techniques described herein relate to techniques for splitting an individual IP flow between multiple wireless networks. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments. Specifics in the examples may be used anywhere in one or more exemplary embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

FIG. 1 depicts an exemplary multiple network configuration in which a mobile client MN can simultaneously access a WLAN 101 and a WWAN 102, and control an IP Intra-Flow Mobility according to the subject matter disclosed herein. As depicted in FIG. 1, mobile client MN is simultaneously connected to the Internet (IP Services) via a WiFi WLAN 101 and a 3G High-Speed Packet Access (HSPA) 102. In one exemplary embodiment, WLAN 101 operates in accordance with, but not limited to, an IEEE-802.11-based protocol. In one exemplary embodiment, WWAN 102 operates in accordance with at least one of but not limited to, a 3GPP-based protocol, a WiMax-based protocol, an UMTS-based protocol, a CDMA2000-based protocol, a GSM-based protocol, a cellular-digital-packet-data-based (CDPD-based) protocol, and/or a Mobitex-based protocol. It should be understood that either of networks 101 or 102 could be wireless networks that are based on any of the exemplary wireless protocols, including both the possibility that both networks are based on the same wireless network protocol. It should also be understood that although only two exemplary wireless networks are depicted in FIG. 1, the subject matter disclosed herein is applicable to situations in which there are three or more available wireless networks.

A conventional IP Flow Mobility technique allows mobile client MN to send a Binding Update Message to a home agent HA, which is part of the home core network for mobile client MN, in order to register multiple local IP addresses for the mobile client MN to a single permanent address (i.e., HoA) at the home agent HA. Each registered local IP address, commonly referred to a Care-of Address (CoA), corresponds to a particular network wireless network.

As depicted in FIG. 1, mobile client MN has registered CoA1 with home agent HA for a first IP flow 1, which could be, for example, a $3^{rd}$-party application, and has registered CoA2 for a second IP flow 2, which could be, for example, a Voice over Internet Protocol (VoIP) application. The first IP flow 1 is sent to mobile client MN via the via WiFi network 101 using local IP address CoA1 and the second IP flow 2 is sent to mobile client MN via 3G HSPA network 102 using CoA2. Accordingly, both IP flows are using the same HoA and, consequently, moving a flow from one network to another network would be completely transparent from the point of view of an IP services application.

The subject matter disclosed herein provides three IP Intra-Flow Mobility techniques for splitting an individual IP flow between multiple wireless networks. The first technique, referred to herein as Mode 1 (or Type 1), utilizes a sequence-based flow-splitting technique. The second technique, referred to herein as Mode 2 (or Type 2), utilizes a size-based flow-splitting technique. The third technique, referred to herein as Mode 3 (or Type 3), utilizes an implicit flow-splitting technique.

Mode 1 can be configured to use all available networks to balance the load for a particular IP flow, thereby increasing end-to-end throughput. Mode 1 is configured by utilizing a first parameter that specifies the number of consecutive packets that are sent via a particular network, and a second parameter that specifies how long a packet waits in a re-ordering buffer until prior-in-sequence packets are received. The first parameter, parameter k[i], sets the number of consecutive packets sent via the i-th network in which $1 \leq i \leq N$ for $N>1$, and in which N is the number of available networks. The second parameter, parameter t, sets the re-ordering timer in milliseconds. As an example illustrating how the parameter t is used, if packet 4 arrives immediately after packet 2, packet 4 will wait in the re-ordering buffer until packet 3 arrives or until the re-ordering time t expires, at which time packet 4 would be forwarded to the destination.

FIG. 2 depicts an exemplary Mode 1 IP Intra-Flow Mobility for N=2 available networks as a function of time T. The parameter k[1] is set to k[1]=2, and the parameter k[2] is set to k[2]=3. Each numbered box in FIG. 2 represents a packet, and the number within each packet represents the sequence number of the packet. Accordingly, two consecutive packets (i.e., packets 1 and 2) are sent via network 1, followed by three consecutive packets (i.e., packets 3, 4 and 5) that are sent via network 2. Two consecutive packets (i.e., packets 6 and 7) are then sent via network 1 followed by three consecutive packets (i.e., packets 8, 9 and 10) that are sent via network 2. Mode 1 is sufficiently flexible in that parameter k[i] can be modified as network conditions change.

Mode 2 splits an IP flow based on a pre-defined Intra-Flow classification technique so that a subset of packets may be sent over a different network, thereby providing a better Quality of Service (QoS). That is, Mode 2 uses a parameter x that indicates the type of classification algorithm that is used for classifying the intra-flow. For example, one type of classification algorithm could be based on packet size, and another type of classification algorithm could be based on packet payload. Similar to Mode 1, Mode 2 also uses a time re-ordering parameter t that sets how long a packet waits in a re-ordering buffer until prior-in-sequence packets are received. A parameter p1[i] sets the minimum packet size of the packets that will be sent via the i-th available network, and a parameter p2[i] sets the maximum packet size of the packets that will be sent via, the i-th available network. In one exemplary embodiment, the packet size is determined based on the number of bytes contained in the packet payload. In another exemplary embodiment, the packet size is determined based on the total number of bytes contained in the packet. Redundancy can be created in the IP Intra-Flow by setting the range of packet sizes of one network to overlap with the range of packet sizes of another network. That is, the redundancy would be the packets having sizes that are carried by both networks. Mode 2 includes a parameter p3[i] that is used to indicate whether a packet will be sent via the i-th available network if (mod(s,N)==p3[i]), in which s is the packet size and N is the number of available networks. According to the subject matter disclosed herein, if x==0 then p1 and p2 are used; and if x==1, then p3 is used.

FIG. 3 depicts an exemplary Mode 2 IP Intra-Flow Mobility for N=2 available networks as a function of time T. For this example, parameter x is set to x=0, parameter p1[1] is set to p1[1]=0, parameter p2[1] is set to p2[1]=200, parameter p1[2] is set to p1[2]=201, and parameter p2[2] is set to p2[2]=1000. No redundancy is used for this example. In FIG. 3, each numbered box represents a packet, and the number within each packet indicates the packet size of the packet. For the example of FIG. 3, all packets that are sent via network 1 have a packet size of between 0 and 200, inclusive, and all packets sent via network 2 have a packet size of between 201 to 1000, inclusive. There is no redundancy in the IP Intra-Flow Mobility because there is no overlap is the packet sizes specified for each network.

The redundancy capability for Mode 2 to transmit the same packet over both networks provides for better reliability. FIG. 4 depicts an exemplary Mode 2 IP Intra-Flow Mobility as a function of time T for N=2 available networks. For the example of FIG. 4, parameter x is set to x=0, parameter p1[1] is set to p1[1]=0, parameter p2[1] is set to p2[1]=200, parameter p1[2] is set to p1[2]=0, and parameter p2[2] is set to p2[2]=1000 in FIG. 4, each numbered box represents a packet, and the number within each packet indicates the packet size of the packet. For this example, all packets having a size of 0-200, inclusive, are sent via both networks 1 and 2, thereby providing redundancy for all packets having a size of 0-200. Packets having a size of 201-1.000, inclusive, are sent only via network 2.

FIG. 5 depicts how the parameter p3 is used by Mode 2 IP Intra-flow Mobility. In particular, FIG. 5 depicts an exemplary Mode 2 IP Intra-flow Mobility as a function of time T for N=2 available networks. For this example, parameter x is set to x=1, parameter p3[1] is set to p3[1]=1, and parameter p3[2] is set to p3[2]=0. That is, packets having an odd size (measured in bytes or in bits) are sent over network 1 (p3[1]=1), and the packets having an even size (measured in bytes or in bits) are sent over network 2 (p3[2]=0). In one exemplary embodiment, parameters p3[1] or p3[2] could be an array having multiple values. For example, parameter p3[1] could be set to p3[1]=1 so that packets having an odd size are sent over network 1, and parameter p3[2] could be set to p3[2]=0 or 1 in order to send all packets over network 2.

For Mode 3, the mobile node MN or the home agent HA can use any of the available networks for a given packet of the flow without an explicit rule. The primary benefit provided by Mode 3 is that the latency introduced by the Binding Update and ACK exchange between the MN and the HA is eliminated. Mode 3 is initiated by a Binding Update/Binding Acknowledgement exchange; however, unlike Modes 1 and 2, no additional Binding Update/Binding Acknowledgement exchanges for changing the flow splitting configuration is required after Mode 3 is started.

Figure 6:
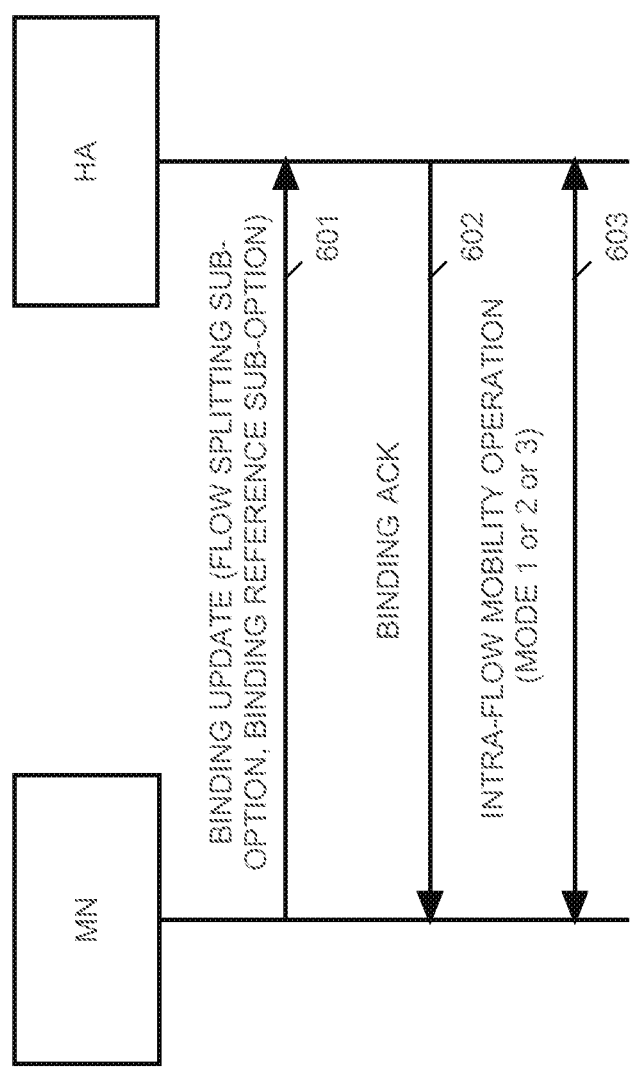
FIG. 6 depicts an exemplary protocol sequence for an IP Intra-Flow Mobility management technique according to the subject matter disclosed herein.

FIG. 6 depicts an exemplary protocol sequence for an IP Intra-Flow Mobility management technique according to the subject matter disclosed herein. At 601, a mobile node MN sends a Binding Update message to home agent HA. The Binding Update message indicates an IP Intra-Flow Mobility Mode 1, 2 or 3, and its configuration, according to the subject matter disclosed herein. The Binding Update message includes information identifying a Flow Splitting sub-option and a Binding Reference sub-option using, for example, the message protocol set forth in RFC 6089—Flow Bindings in Mobile IPv6 and Network Mobility (NEMO) Basic Support.

At 602, home agent HA sends a Binding Acknowledgement message to mobile node MN confirming the requested operation. At 603, home agent HA and mobile node MN start sending traffic to each other, and an IP flow is split across multiple networks according to the confirmed IP Intra-Flow Mobility flow-splitting parameters. For Mode 1 or 2, if the parameters change, protocol sequence returns to 601. For Mode 3, however, mobile node MN can change the way of splitting the uplink flow immediately without going through 601 and 602. That is, for Modes 1 and 2, the MN determines the flow splitting configuration, whereas for Mode 3, the sender determines the flow splitting configuration. For a downlink, the HA is the sender, and therefore HA determines how to split the flow. For an uplink, the MN is the sender, and determines how to split. And the change is explicit and immediate without requiring any message exchange between HA and MN.

The following three IP Intra-Flow Mobility Modes according to the subject matter disclosed herein are communicated by including the mode identification and parameter information in the sub-options portion of a Binding Update message.

For example, for a Mode 1 IP Intra-Flow Mobility technique, the mode identification and parameter information that is included in the sub-options portion of a Binding Update message includes a sub-option type (Type) field, a sub-option length (Len) field and data for the sub-option specifying the direction of the intra-flow splitting, the re-ordering timer duration, the packet number (PN) and the rate limit (RL).

In one exemplary embodiment, the sub-option Type field for a Mode 1 IP intra-Flow Mobility sub-option comprises an 8-bit unsigned integer having a value that uniquely identifies the Mode 1 IP Intra-Flow Mobility sub-option. For example, the Mode 1 IP Intra-Flow Mobility sub-option could be identified by an 8-bit unsigned integer having a value of "123." The sub-option Len comprises an 8-bit unsigned integer representing the length in bytes of the parameter data for the Mode 1 IP Intra-Flow Mobility sub-option.

Parameter data for a Mode 1 IP Intra-Flow Mobility sub-option includes an Intra-Flow Direction parameter that comprises in one exemplary embodiment an 8-bit unsigned integer indicating the whether the flow splitting applies to the downlink and/or uplink of the flow. For example, the value "0" could be used to indicate that the flow splitting applies to both the downlink and the uplink; the value "1" could be used to indicate that the flow splitting applies to the downlink only; and the value "2" could be used indicate that the flow splitting applies to the uplink only. It should be understood that other values could be used for setting the particular directions of Intra-Flow Direction parameter.

Additionally, the Mode 1 IP Intra-Flow Mobility sub-option includes a re-ordering timer (RT) parameter field, which comprises in one exemplary embodiment a 16-bit unsigned integer indicating the maximum time (millisecond) of a packet waiting at the receiver for re-ordering. A packet number (PLY) parameter field (which corresponds to parameter k[i] described elsewhere herein) comprises a 16-bit unsigned integer indicating the number of consecutive packets sent with the corresponding BID. The rate limit (RL) parameter field comprises an unsigned integer indicating the maximum IP layer data rate that the flow is allowed to send over the corresponding network.

In one exemplary embodiment, the sequential position of the PN field in the sub-option portion of the Binding Update message corresponds on a one-to-one basis to the BID field in a conventional Binding Reference sub-option. That is, the first PN field in the Mode 1 IP Intra-Flow Mobility flow splitting sub-option corresponds to the first BID field in the Binding Reference sub-option of the same Flow Identification Mobility option.

In another exemplary embodiment, the sequential position of the RL field in the sub-option portion of the Binding Update message corresponds on a one-to-one basis to the BID field of a conventional Binding Reference sub-option.

In another exemplary embodiment, the IP Flow Identification Mobility option of the Binding Update message could include two Flow Splitting sub-options one for the downlink, and one for the uplink.

In one exemplary embodiment, a Mode 1 IP Intra-Flow Mobility sub-option may include multiple PAT fields, but should have only one RT field.

Mode identification and parameter information for a Mode 2 IP Intra-Flow Mobility technique includes a sub-option type (Type) field, a sub-option length (Len) field and parameter data for the sub-option that specifies the direction of the intra-flow splitting, the re-ordering timer duration, an Intra-Flow Classification Type (IFCT), an Intra-Flow Classification Parameter (IFCP) and the rate limit (RL).

In one exemplary embodiment, the sub-option Type field for a Mode 2 IP Intra-How Mobility sub-option comprises an 8-bit unsigned integer having a value that uniquely identifies the Mode 2 IP Intra-Flow Mobility sub-option. For example, the Mode 2 Intra-How Mobility sub-option could be identified by an 8-bit unsigned integer having a value of "124." The sub-option Len comprises an 8-bit unsigned integer representing the length in bytes of the parameter data for the particular sub-option.

Parameter data for a Mode 2 IP Intra-Flow Mobility sub-option includes an Intra-Flow Direction parameter that comprises in one exemplary embodiment an 8-bit unsigned integer indicating the whether the flow splitting applies to the downlink and/or uplink of the flow. For example, the value "0" could be used to indicate that the flow splitting applies to both the downlink and the uplink; the value "1" could be used to indicate that the flow splitting applies to the downlink only; and the value "2" could be used to indicate that the flow splitting applies to the uplink only. It should be understood that other values could be used for setting the particular directions of Intra-Flow Direction parameter.

Additionally, the Mode 2 IP Intra-Flow Mobility sub-option includes a re-ordering timer (RT) parameter field, which comprises in one exemplary embodiment a 16-bit unsigned integer indicating the maximum time (millisecond) of a packet waiting at the receiver for re-ordering. The Intra-Flow Classification Type (IFCT) parameter in one exemplary embodiment comprises an 8-bit unsigned integer that indicates the type of the IP Intra-Flow classification algorithm, and the Intra-Flow Classification Parameter (IFCP) comprises an a unsigned integer indicating the parameter of the intra-flow classification algorithm. The rate limit (RL) parameter field comprises an unsigned integer indicating the maximum IP layer data rate that the flow is allowed to send over the corresponding network.

In one exemplary embodiment, if IFCT==0, the IFCT field will have 32 bits in which the 16 most significant bits (MSBs) indicate the maximum packet size of the packets sent with the corresponding BID, and the 16 lowest significant bits (LSBs) indicate the minimum packet size. If IFCT=1, the IFCP field will have 8 bits to carry the p3 parameter.

In one exemplary embodiment, the sequential position of the IFCP field in the sub-option portion of the Binding Update message corresponds on a one-to-one basis to the BID field in a conventional Binding Reference sub-option. In another exemplary embodiment, the sequential position of the RL field in the sub-option portion of the Binding Update message corresponds on a one-to-one basis to the BID field in a conventional Binding Reference sub-option. Therefore, a Mode 2 IP Intra-Flow Mobility flow-splitting sub-option should carry exactly the same number of IFCP or RL fields as the number of BID fields in the Binding Reference sub-option.

Mode identification and parameter information for a Mode 3 IP Intra-Flow Mobility technique includes a sub-option type (Type) field, a sub-option length (Len) field and parameter data for the sub-option that sets the re-ordering timer duration, the direction of the intra-flow splitting and the rate limit (RL).

In one exemplary embodiment, the sub-option Type field for a Mode 3 IP Intra-Flow Mobility sub-option comprises an 8-bit unsigned integer having a value that uniquely identifies the Mode 3 IP Intra-Flow Mobility sub-option. For example, the Mode 3 IP Intra-Flow Mobility sub-option could be identified by an 8-bit unsigned integer having a value of "125." The sub-option Len comprises an 8-bit unsigned integer representing the length in bytes of the parameter data for the Mode 3 IP Intra-Flow Mobility sub-option.

In one exemplary embodiment, the sub-option Type field for a Mode 3 IP Intra-Flow Mobility sub-option comprises an 8-bit unsigned integer having a value that uniquely identifies the Mode 3 IP Intra-Flow Mobility sub-option. For example, the Mode 3 IP Intra-How Mobility sub-option could be identified by an 8-bit unsigned integer having a value of "125." The sub-option Len comprises an 8-bit unsigned integer representing the length in bytes of the parameter data for the Mode 3 IP Intra-Flow Mobility sub-option.

The rate limit (RL) parameter field comprises an unsigned integer indicating the maximum IP layer data rate that the flow is allowed to send over the corresponding network.

When Mode 3 Flow Splitting sub-option is present in the Flow identification Mobility option, all the networks having BIDs that are included in the Binding Reference sub-option of the same Flow Identification Mobility option can be used to send the flow.

The use of Re-ordering Timer is the same as in the Mode 1 and Mode 2 sub-options. The RL field corresponds to the BID field in the Binding Reference sub-option sequentially on a one-to-one basis. Therefore, a Mode 3 Flow Splitting sub-option should carry exactly the same number of RL fields as the number of BID fields in the Binding Reference sub-option.

In network configurations that include an Access Network Discovery and Selection Function (ANDSF) server or entity, the subject matter disclosed herein could be used by the ANDSF entity to provide IP Intra-Flow Mobility management information to a mobile client MN, thereby allowing the mobile client MN to know where, when and how to manage IP Intra-Flow Mobility. Such an ANDSF server could be located within the home network of the mobile client MN, or could be located in a visited network and accessed by the mobile client MN (see, for example, FIG. 1). In one exemplary embodiment, the ANDSF entity generates management parameters that can either be "pushed" to or be "pulled" by a mobile client for configuring IP Intra-Flow Mobility. When the management parameters are received from the ANDSF entity, the mobile client MN utilizes the received management parameters when using an Intra-Flow Mobility.

Exemplary management parameters generated by an ANDSF entity for IP Intra-Flow Mobility management according to the subject matter disclosed herein include a maximum re-ordering timer parameter $RT_{max}$; a minimum re-ordering timer $RT_{min}$; a rate limit parameter Si (e.g., in kBps) for the i-th ($1 \leq I \leq N$) network in which the i-th network can be uniquely identified by the combination of the existing "AccessId" and "AccessTechnology" MO (Management Object) parameters, as set forth in 3GPP TS 24.312, $3^{rd}$ Generation Partnership Project; Technical Specification Group Core Network and Terminals; Access Network Discovery and Selection Function (ANDSF) Management Object (MO). If the AccessTechnology MO parameter is set to 0, then there is no limit for the data rate, whereas if the AccessTechnology MO parameter is set to a value that is greater than >1, the data rate is the maximum IP layer data rate for the network. At least one network should be configured with an "unlimited" data rate so that it can be used to transmit extra packets when the rate limit of another network is reached.

A parameter C is used for indicating the direction of the flow the management parameters. For example, if parameter C is set to the value 0, the management parameters apply to both downlink and uplink IP Intra-Flow Mobility. If parameter C is set to the value 1, then the management parameters apply to a downlink IP Intra-Flow Mobility, and if parameter C is set to 2, then the management parameters apply to an uplink IP Intra-Flow Mobility.

For Mode 1, additional parameters are applicable. A K max(i) parameter sets the maximum number of consecutive packets sent via the i-th ($1 \leq I \leq N$) network, and a K min(i) parameter set the minimum number of consecutive packets sent via the i-th ($1 \leq I \leq N$) network.

Figure 7:
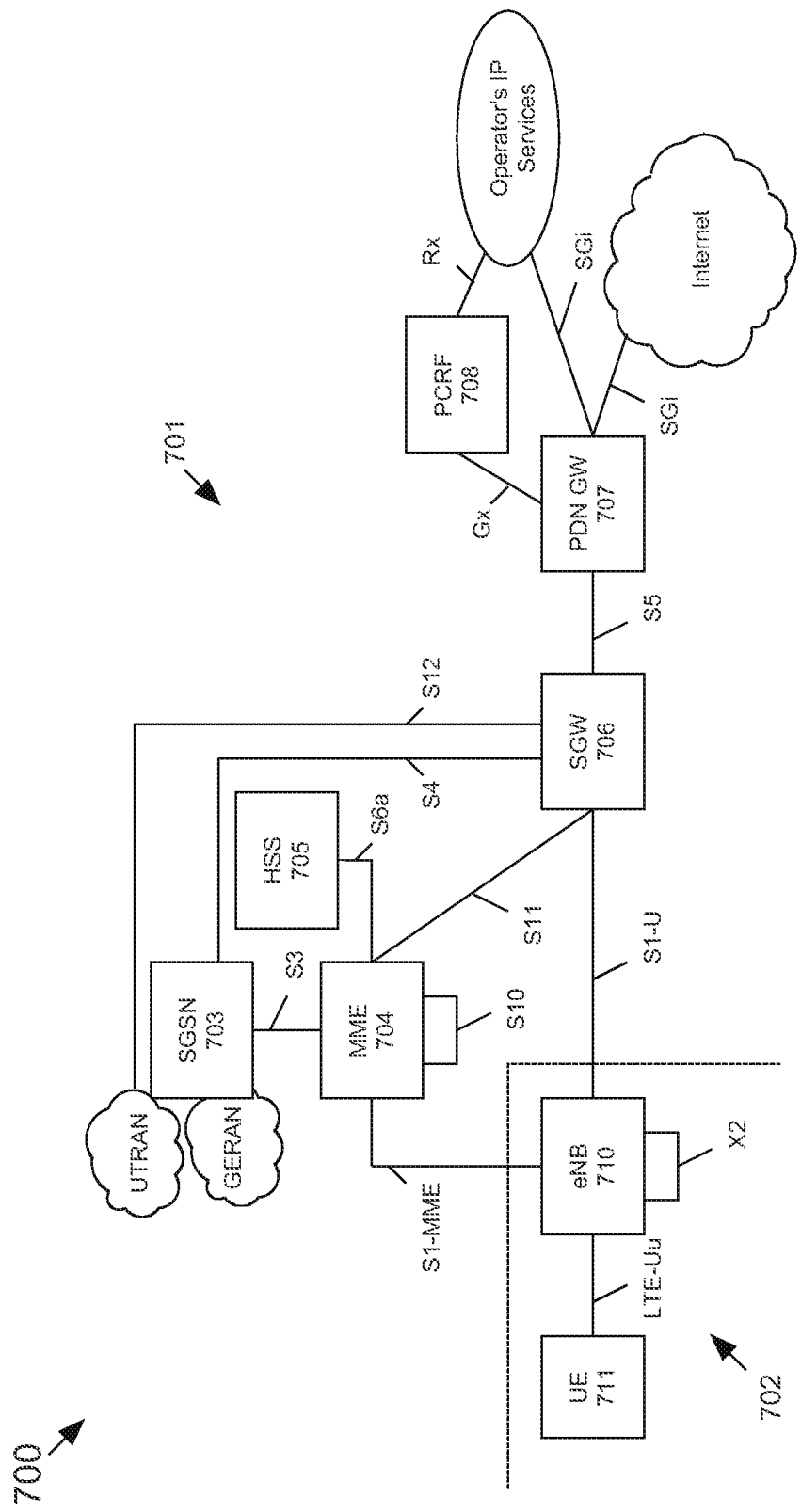
FIG. 7 shows an exemplary block diagram of the overall architecture of a 3GPP LTE network 700 that utilizes IP Intra-Flow Mobility techniques according to the subject matter disclosed herein.

FIG. 7 shows a exemplary block diagram of the overall architecture of a 3GPP LTE network 700 that utilizes IP Intra-Flow Mobility techniques according to the subject matter disclosed herein. FIG. 7 also generally shows exemplary network elements and exemplary standardized interfaces. At a high level, network 700 comprises a core network (CN) 701 (also referred to as an evolved Packet System (EPC)), and an air-interface access network E-UTRAN 302, CN 301 is responsible for the overall control of the various User Equipment (UE) connected to the network and establishment of the bearers. CN 301 may include functional entities, such as a home agent HA and/or an ANDSF server or entity, although not explicitly depicted. E-UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PUN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E-UTRAN access network 702 is formed by one node, the evolved NodeB (base station (BS), eNB or eNodeB) 710, which connects to one or more User Equipment WE) 711, of which only one is depicted in FIG. 7. UE 711 is also referred to herein as a wireless device (WD) and/or a subscriber station (SS), and can include a mobile client MN. In one exemplary configuration, a single cell of an E-UTRAN access network 702 provides one substantially localized geographical transmission point (having multiple antenna devices) that provides access to one or more UEs. In another exemplary configuration, a single cell of an E-UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1-MME interface and to SGW 706 by an S1-U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DU/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

Figure 8:
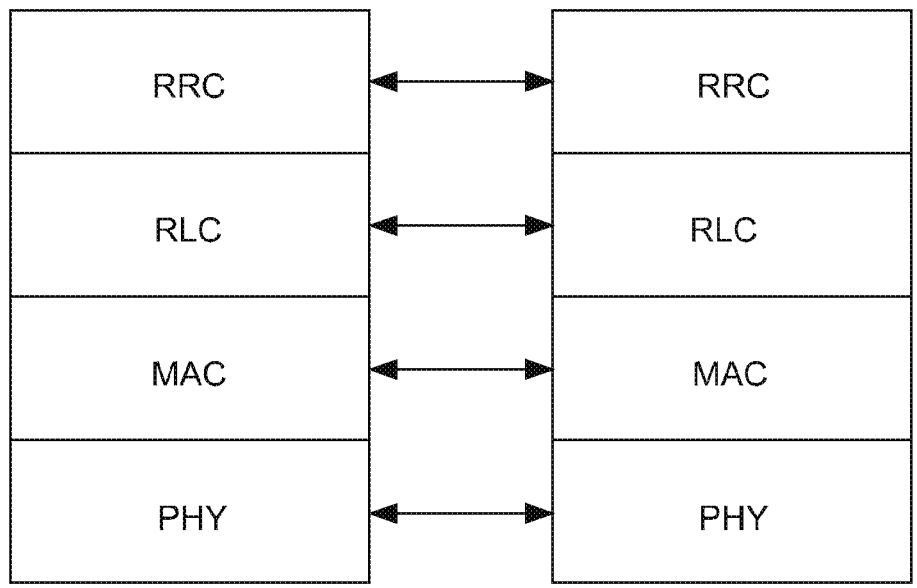
FIGS. 8 and 9 respectively depict exemplary radio interface protocol structures between a UE and an eNodeB that are based on a 3GPP-type radio access network standard and that utilizes IP Intra-How Mobility according to the subject matter disclosed herein.
Figure 9:
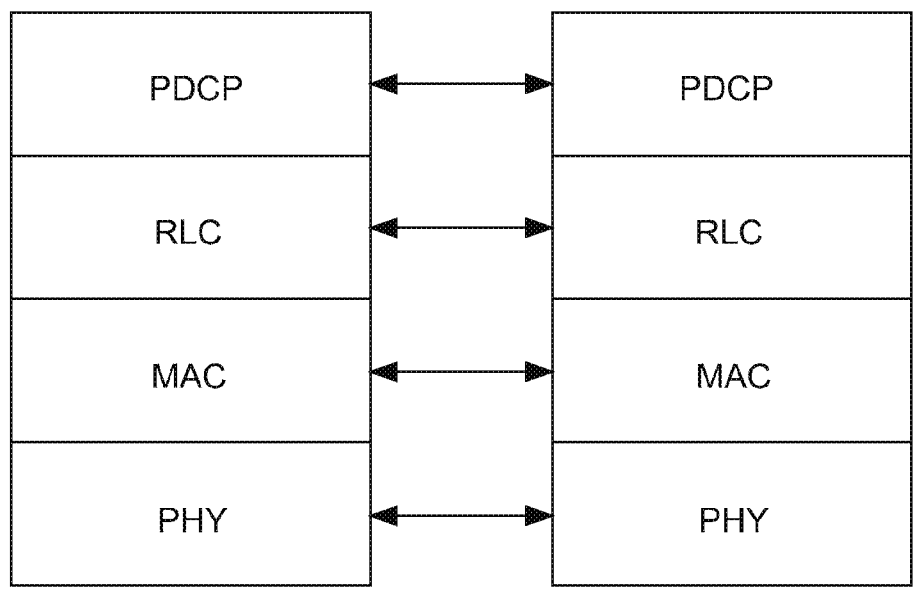

FIGS. 8 and 9 respectively depict exemplary radio interface protocol structures between a UE and an eNodeB that are based on a 3GPP-type radio access network standard and that utilizes IP Infra-Flow Mobility according to the subject matter disclosed herein. More specifically, FIG. 8 depicts individual layers of a radio protocol control plane and FIG. 9 depicts individual layers of a radio protocol user plane. The protocol layers of FIGS. 8 and 9 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the LIE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink. SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (MICH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK. Scheduling Request (SR) and Channel Quality Indicator (CQI) report information, received from first and second layers (L1 and L2).

Figure 10:
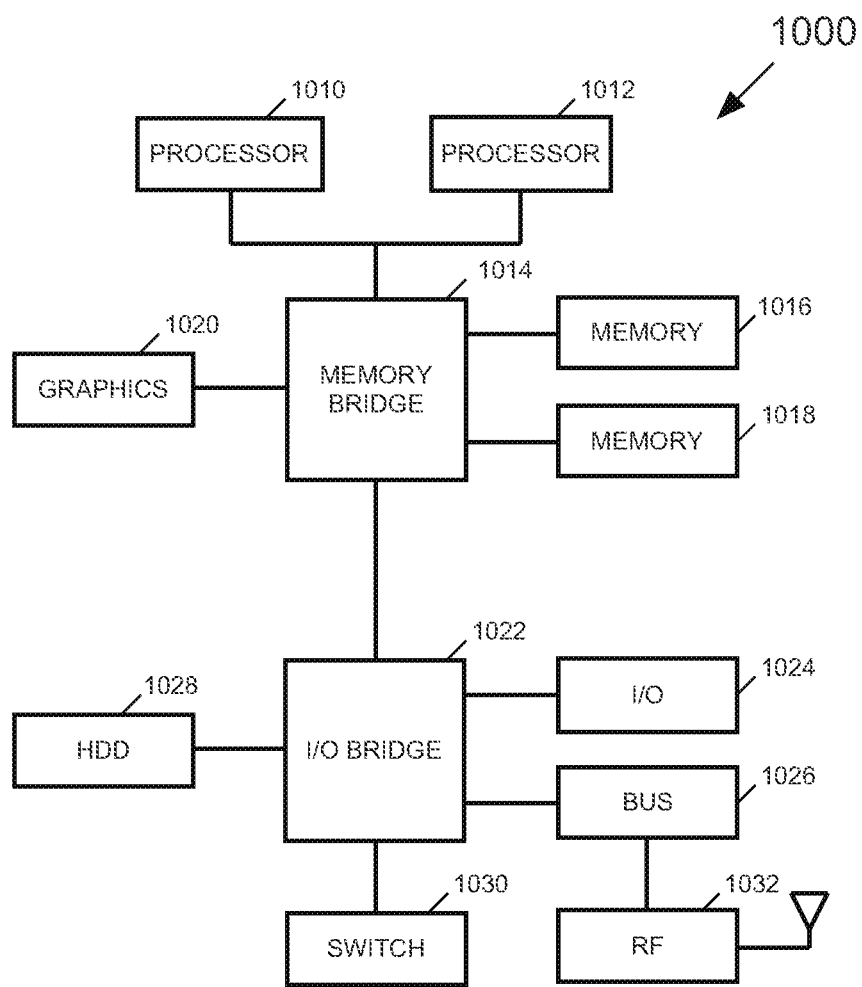
FIG. 10 depicts an exemplary functional block diagram of an information-handling system that utilizes IP Intra-Flow Mobility techniques according to the subject matter disclosed herein.

FIG. 10 depicts an exemplary functional block diagram of an information-handling system 1000 that utilizes IP Intra-Flow Mobility techniques according to the subject matter disclosed herein. Information-handling system 1000 of FIG. 10 may tangibly embody one or more of any of the exemplary network elements and/or functional entities of core network 701 as shown in and described with respect to FIG. 7. For example, information-handling system 1000 may represent the components of mobile client MN, eNB 1010, and/or UE 1011, with greater or fewer components depending on the hardware specifications of the particular device or network element. Although information-handling system 1000 represents one example of several types of computing platforms, information-handling system 1000 may include more or fewer elements and/or different arrangements of elements than shown in FIG. 10, and the scope of the claimed subject matter is not limited in these respects.

Information-handling system 1000 may comprise one or more processors, such as processor 1010 and/or processor 1012, which may comprise one or more processing cores. One or more of processor 1010 and/or processor 1012 may couple to one or more memories 1016 and/or 1018 via memory bridge 1014, which may be disposed external to processors 1010 and/or 1012, or alternatively at least partially disposed within one or more of processors 1010 and/or 1012. Memory 1016 and/or memory 1018 may comprise various types of semiconductor-based memory, for example, volatile-type memory and/or non-volatile-type memory. Memory bridge 1014 may couple to a graphics system 1020 to drive a display device 1022. In one exemplary embodiment, display device 1022 provides a touchscreen-type capability that is controllable by a stylus and/or a finger.

Information-handling system 1000 may further comprise input/output (I/O) bridge 1024 to couple to various types of I/O systems. I/O system 1026 may comprise, for example, a universal serial bus (USB) type system, an IEEE-1394-type system, or the like, to couple one or more peripheral devices to information-handling system 1000. Bus system 1028 may comprise one or more bus systems, such as a peripheral component interconnect (PCI) express type bus or the like, to connect one or more peripheral devices to information-handling system 1000. A hard disk drive (HDD) controller system 1030 may couple one or more hard disk drives or the like to information handling system, for example, serial ATA-type drives or the like, or alternatively a semiconductor based drive comprising flash memory, phase change, and/or chalcogenide type memory or the like. Switch 1032 may be utilized to couple one or more switched devices to I/O bridge 1024, for example Gigabit Ethernet type devices or the like. Furthermore, as shown in FIG. 10, information-handling system 1000 may include one or more radio-frequency (RF) blocks 1034 comprising RF circuits and devices for wireless communication with other wireless communication devices and/or via wireless networks, such as core network 701 of FIG. 7, for example, in which information-handling system 1000 embodies base station 710 and/or wireless device 711, although the scope of the claimed subject matter is not limited in this respect. In one or more embodiments, information-handling system could comprise a macro eNB, a RRH, a legacy UE, a Rel. 11 UE, or a wireless device.

In one exemplary embodiment, information-handing system comprises at least two RF blocks 1034 that are each capable of receiving a respectively selected portion of a downlink data flow signal from a corresponding wireless network (not shown in FIG. 10), in which each respective wireless network is different from another wireless network. Each wireless network could comprises, but is not limited to, an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network. According to the subject matter disclosed herein, the downlink data flow signal comprising a single downlink data flow that is associated with an Internet-Protocol-based services application. Processor 1010 and/or processor 1012 is coupled to each RF block 1034 and is capable of combining each respectively received portion of the downlink data flow signal to form the single downlink data flow associated with the Internet-Protocol-based services application. The formed single downlink data flow to a client entity, which may effectuated by, for example, firmware stored in memory 1016 and/or 1018 and executed by processor 1010 and/or processor 1012.

In one exemplary embodiment, a first selected portion of the downlink data flow comprises a first group of data packets received from a first wireless network, and in which the first group of data packets comprise a first predetermined number of data packets that are consecutively arranged with respect to each other. A second selected portion of the downlink data flow comprises a second group of data packets received from a second wireless network, such that the second group of data packets comprises a second predetermined number of data packets that are consecutively arranged with respect to each other. According to the subject matter disclosed herein, the first group of data packets and the second group of data packets are alternatingly arranged with respect to each other.

In another exemplary embodiment, the first selected portion of the downlink data flow comprises a first group of data packets comprising a first predetermined range of data packet sizes, and the second selected portion of the downlink data flow comprises a second group of data packets comprising a second predetermined range of data packet sizes. For this exemplary embodiment, the first predetermined range of packet sizes does not overlap with the second predetermined range of packet sizes. For an alternative exemplary embodiment, the first predetermined range of packet sizes overlaps at least a portion of the second predetermined range of packet sizes. For yet another exemplary embodiment, the first predetermined range of packet sizes comprises packet sizes having an odd number of bits, and the second predetermined range of packet sizes comprises packet sizes having an even number of bits.

In one exemplary embodiment, information-handling system 1000 comprises at least two RF blocks 1034 that are capable of transmitting respectively selected portions of an uplink data flow to a correspondingly different wireless network (not shown in FIG. 10). Each wireless network could comprises, but is not limited to, an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network. Accordingly to the subject matter disclosed herein, the uplink data flow comprises a single uplink data flow associated with the Internet-Protocol-based services application.

In one exemplary embodiment, a first selected portion of the uplink data flow comprises a first group of data packets sent over a first wireless network, such that the first group of data packets comprises a first predetermined number of data packets consecutively arranged with respect to each other. A second selected portion of the uplink data flow comprises a second group of data packets sent over a second wireless network, such that the second group of data packets comprises a second predetermined number of data packets consecutively arranged with respect to each other. According to the subject matter disclosed herein, the first group of data packets and the second group of data packets are alternatingly arranged with respect to each other in the uplink data flow. In one exemplary embodiment, at least one RF block 1034 is capable of transmitting information from the client entity to a home agent of the client entity identifying the first and second predetermined numbers.

In another exemplary embodiment, a first selected portion of the uplink data flow comprises a first group of data packets sent over a first wireless network in which the first group of data packets comprise a first predetermined range of data packet sizes. A second selected portion of the uplink data flow comprises a second group of data packets sent over a second wireless network in which the second group of data packets comprise a second predetermined range of data packet sizes. For this exemplary embodiment, the first predetermined range of packet sizes does not overlap with the second predetermined range of packet sizes. For an alternative exemplary embodiment, the first predetermined range of packet sizes overlaps at least a portion of the second predetermined range of packet sizes. For yet another exemplary embodiment, the first predetermined range of packet sizes comprises packet sizes having an odd number of bits, and the second predetermined range of packet sizes comprises packet sizes having an even number of bits. In one exemplary embodiment, at least one RF block 1034 is capable of transmitting information from the client entity to a home agent of the client entity identifying the first and second predetermined ranges of packet sizes.

In one exemplary embodiment, at least one RF block 1034 is capable of receiving information from at least one wireless network generated by ANDSF entity that identifies other wireless networks from which selected portions of the downlink data flow can be received. At least one RF block 1034 is also capable of transmitting information to a home agent of the client entity identifying each selected portion of the downlink data flow that is to be received from a corresponding wireless network.

Figure 11:
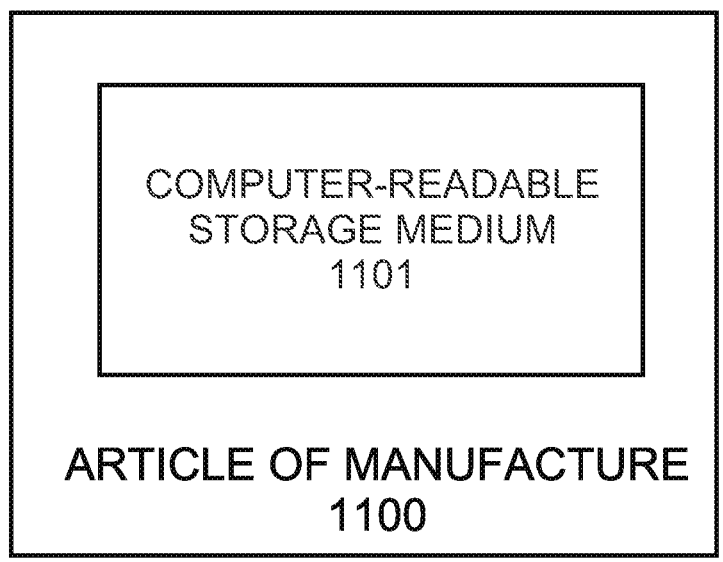
FIG. 11 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 11 depicts an exemplary embodiment of an article of manufacture 1100 comprising a non-transitory computer-readable storage medium 1101 having stored thereon computer-readable instructions that, when executed by a computer-type device, results in any of the various techniques and methods according to the subject matter disclosed herein. Exemplary computer-readable storage mediums that could be used for computer-readable storage medium 1101 could be, but are not limited to, a semiconductor-based memory, an optically based memory, a magnetic-based memory, or a combination thereof.

In one exemplary embodiment, execution of the computer-readable instructions stored on computer-readable medium 1101 by a computer-type device results in receiving at a client entity selected portions of a downlink data flow from at least two correspondingly different wireless networks of a plurality of wireless networks, such that the downlink data flow comprises a single downlink data flow associated with an Internet-Protocol-based services application. In one exemplary embodiment, a first selected portion of the downlink data flow comprises a first group of data packets received from a first wireless network, such that the first group of data packets comprises a first predetermined number of consecutively arranged data packets, and a second selected portion of the downlink data flow comprises a second group of data packets received from a second wireless network, such that the second group of data packets comprising a second predetermined number of consecutively arranged data packets. Accordingly, the first and second groups of data packets are alternatingly arranged in the downlink data flow, so that the first group of data packets and the second group of data packets are received in an alternating sequence at the client entity. In another exemplary embodiment, information is sent from the client entity to a home agent of the client entity identifying the first and second predetermined numbers. In still another exemplary embodiment, a first selected portion of the downlink data flow comprises a first group of data packets received from a first wireless network, such that the first group of data packets comprises a first predetermined range of data packet sizes, and a second selected portion of the downlink data flow comprises a second group of data packets received from a second wireless network, such that the second group of data packets comprises a second predetermined range of data packet sizes. In one exemplary embodiment, the first predetermined range of packet sizes does not overlap with the second predetermined range of packet sizes. In another exemplary embodiment, the first predetermined range of packet sizes overlaps at least a portion of the second predetermined range of packet sizes. In still another exemplary embodiment, the first predetermined range of packet sizes comprises packet sizes having an odd size, and the second predetermined range of packet sizes comprises packet sizes having an even size. In an exemplary embodiment, information is sent from the client entity to a home agent of the client entity identifying the first and second predetermined ranges of packet sizes. The correspondingly different wireless network comprise one of an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

Further still, in one exemplary embodiment, information is received from at least one wireless network identifying other wireless networks from which selected portions of the downlink data flow can be received, and information is sent to a home agent of the client entity identifying the selected portion of the downlink data flow that is to be received from a corresponding wireless network. In another exemplary embodiment, selected portions of an uplink data flow are sent from the client entity to at least two correspondingly different wireless networks of the plurality of wireless networks, such that the uplink data flow comprises a single uplink data flow associated with the Internet-Protocol-based services application. In another exemplary embodiment, a first selected portion of the uplink data flow comprises a first group of data packets sent over a first wireless network, such that the first group of data packets comprises a first predetermined number of consecutively arranged data packets, and a second selected portion of the uplink data flow comprises a second group of data packets sent over a second wireless network, such that the second group of data packets comprises a second predetermined number of consecutively arranged data packets. Accordingly, the first group of data packets and the second group of data packets are alternatingly arranged in the uplink data flow, and are sent in an alternating sequence from the client entity the first group of data packets and the second group of data packets. In one exemplary embodiment, information is sent from the client entity to a home agent of the client entity identifying the first and second predetermined numbers. In another exemplary embodiment, a first selected portion of the uplink data flow comprises a first group of data packets sent over a first wireless network, such that the first group of data packets comprises a first predetermined range of data packet sizes, and a second selected portion of the uplink data flow comprises a second group of data packets sent over a second wireless network, such that the second group of data packets comprises a second predetermined range of data packet sizes. In one exemplary embodiment, the first predetermined range of packet sizes does not overlap with the second predetermined range of packet sizes. In another exemplary embodiment, the first predetermined range of packet sizes overlaps at least a portion of the second predetermined range of packet sizes. In still another exemplary embodiment, the first predetermined range of packet sizes comprises packet sizes having an odd size, and the second predetermined range of packet sizes comprises packet sizes having an even size. In yet another exemplary embodiment, information is sent from the client entity to a home agent of the client entity identifying the first and second predetermined ranges of packet sizes. The correspondingly different wireless network comprises one of an IEEE-802.11-based protocol wireless network, a 3GPP-based protocol wireless network, a WiMax-based protocol wireless network, an UNITS-based protocol wireless network, a CDMA2000-based protocol wireless network, a GSM-based protocol wireless network, a cellular-digital-packet-data-based (CDPD-based) protocol wireless network, or a Mobitex-based protocol wireless network.

In another exemplary embodiment, a first selected portion of a downlink data packet flow is received at a client entity from a first wireless network. The downlink data packet flow is associated with an Internet-Protocol-based services application, and the first selected portion of the downlink data flow comprises data packets of the downlink data packet flow that match a first packet characteristic. A second selected portion of the downlink data flow is received at the client entity a from a second wireless network. The second selected portion of the downlink data flow comprises data packets of the downlink data packet flow that match a second packet characteristic. In one exemplary embodiment, the first packet characteristic comprises a first predetermined number of consecutively arranged data packets, and the second packet characteristic comprises a second predetermined number of consecutively arranged data packets. The second packet characteristics are alternatingly arranged in the downlink data flow. Accordingly, the first selected portion and the second selected portion of the downlink data packet flow are received in an alternating sequence at the client entity. In another exemplary embodiment, information is sent from the client entity to a home agent of the client entity identifying the first and second packet characteristics. In one exemplary embodiment, the first packet characteristic comprises a first predetermined range of data packet sizes, and the second packet characteristic comprises a second predetermined range of data packet sizes. In another exemplary embodiment, the first predetermined range of packet sizes does not overlap with the second predetermined range of packet sizes. In yet another exemplary embodiment, the first predetermined range of packet sizes overlaps at least a portion of the second predetermined range of packet sizes. In still another exemplary embodiment, the first predetermined range of packet sizes comprises packet sizes having an odd size, and the second predetermined range of packet sizes comprises packet sizes having an even size. In should be understood that the first and second wireless networks respectively comprise, but are not limited to, an IEEE-802.11-based protocol wireless network, a 3GPP-based protocol wireless network, a WiMax-based protocol wireless network, an UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network. In still another exemplary embodiment, information is received from the first wireless network or the second wireless network identifying other wireless networks from which selected portions of the downlink data packet flow can be received; and information is sent to a home agent of the client entity identifying the selected portions of the downlink data packet flow that is to be received from the first wireless network and the second wireless network. In another exemplary embodiment, a first selected portion of an uplink data flow is sent from the client entity to the first wireless and a second selected portion of the uplink data flow to the second wireless networks, such that the uplink data flow comprises a single uplink data flow associated with the Internet-Protocol-based services application.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless communication device, comprising:
   at least two receivers that are configured to receive a respectively selected portion of a downlink data flow signal from a corresponding different wireless network, the downlink data flow signal comprising a single downlink data flow being associated with an Internet-Protocol-based services application, and
   a processor coupled to the at least two receivers and configured to combine the respectively received portions of the downlink data flow signal to form the single downlink data flow associated with the Internet-Protocol-based services application, and providing the formed single downlink data flow to a client entity associated with the processor;
   wherein a first one of the at least two receivers is configured to receive a first selected portion of the downlink data flow comprising a first group of data packets from a first wireless network, the first group of data packets comprising a first predetermined number of consecutively arranged data packets, and
   wherein a second one of the at least two receivers is configured to receive a second selected portion of the downlink data flow comprising a second group of data packets from a second wireless network, the second group of data packets comprising a second predetermined number of consecutively arranged data packets, and
   wherein the first one and the second one of at least two receivers are configured to receive the first group of data packets and the second group of data packets as an alternating arrangement in the downlink data flow.

2. The wireless communication device according to claim 1, further comprising at least one transmitter configured to transmit information to a home agent of the client entity identifying the first and second predetermined numbers.

3. The wireless communication device according to claim 1, wherein the first one of the at least two receivers is configured to receive a first selected portion of the downlink data flow comprising a first group of data packets from a first wireless network, the first group of data packets comprising a first predetermined range of data packet sizes, and
   wherein the second one of the at least two receivers is configured to receive a second selected portion of the downlink data flow comprising a second group of data packets from a second wireless network, the second group of data packets comprising a second predetermined range of data packet sizes.

4. The wireless communication device according to claim 3, wherein the first one of the at least two receivers is configured to receive the first predetermined range of packet sizes such that the first predetermined range of packet sizes does not overlap with the second predetermined range of packet sizes.

5. The wireless communication device according to claim 3, wherein the first one of the at least two receivers is configured to receive the first predetermined range of packet sizes such that the first predetermined range of packet sizes overlaps at least a portion of the second predetermined range of packet sizes.

6. The wireless communication device according to claim 3, wherein the first one of the at least two receivers is configured to receive the first predetermined range of packet sizes comprising packet sizes having an odd size, and wherein the second one of the at least two receivers is configured to receive the second predetermined range of packet sizes comprising packet sizes having an even size.

7. The wireless communication device according to claim 2, wherein the at least one transmitter is configured to transmit information to a home agent of the client entity identifying the first and second predetermined ranges of packet sizes.

8. The wireless communication device according to claim 1, further comprising at least two transmitters, wherein at least one of the at least two transmitters is configured to send from the client entity selected portions of an uplink data flow to a corresponding different wireless network, the uplink data flow comprising a single uplink data flow associated with the Internet-Protocol-based services application.

9. The wireless communication device according to claim 1, further comprising a touchscreen display coupled to the processor and configured to display at least a portion of the downlink data flow, and configured to be controlled by a stylus, at least one finger, or a combination thereof.

10. A wireless communication device, comprising:
    at least two transmitters that are configured to send selected portions of an uplink data flow to a corresponding different wireless network, the uplink data flow comprising a single uplink data flow from a client entity to an Internet-Protocol-based services application; and
    a processor coupled to the at least two transmitters and configured to arrange the respectively selected portions of the uplink data flow signal;
    wherein a first one of the at least two transmitters is configured to transmit a first selected portion of the uplink data flow comprising a first group of data packets over a first wireless network, the first group of data packets comprising a first predetermined number of consecutively arranged data packets,
wherein a second one of the at least two transmitters is configured to transmit a second selected portion of the uplink data flow comprising a second group of data packets over a second wireless network, the second group of data packets comprising a second predetermined number of consecutively arranged data packets, and
wherein the first one and the second one of the at least two transmitted are configured to transmit the first group of data packets and the second group of data packets in an alternating arrangement in the uplink data flow.

11. The wireless communication device according to claim 10, wherein at least one of the at least two transmitters is further configured to send information from the client entity to a home agent of the client entity identifying the first and second predetermined numbers.

12. The wireless communication device according to claim 10, wherein the first one of the at least two transmitters is configured to transmit a first selected portion of the uplink data flow comprising a first group of data packets over a first wireless network, the first group of data packets comprising a first predetermined range of data packet sizes, and
wherein the second one of the at least two transmitters is configured to transmit a second selected portion of the uplink data flow comprising a second group of data packets over a second wireless network, the second group of data packets comprising a second predetermined range of data packet sizes.

13. The wireless communication device according to claim 12, wherein the first one of the at least two transmitters is configured to transmit the first predetermined range of packet sizes such that the first predetermined range of packet sizes does not overlap with the second predetermined range of packet sizes.

14. The wireless communication device according to claim 12, wherein the first one of the at least two transmitters is configured to transmit the first predetermined range of packet sizes such that the first predetermined range of packet sizes overlaps at least a portion of the second predetermined range of packet sizes.

15. The wireless communication device according to claim 12, wherein the first one of the at least two transmitters is configured to transmit the first predetermined range of packet sizes comprising packet sizes having an odd size, and the second one of the at least two transmitters is configured to transmit the second predetermined range of packet sizes comprising packet sizes having an even size.

16. The wireless communication device according to claim 12, wherein at least one of the at least two transmitters is configured to send information from the client entity to a home agent of the client entity identifying the first and second predetermined ranges of packet sizes.

17. The wireless communication device according to claim 10, further comprising a touchscreen display coupled to the processor and configured to display at least a portion of the uplink data flow, and configured to be controlled by a stylus, at least one finger, or a combination thereof.

18. A communication method, comprising:
receiving at a client entity selected portions of a downlink data flow from at least two correspondingly different wireless networks of a plurality of wireless networks, the downlink data flow comprising a single downlink data flow associated with an Internet-Protocol-based services application;
receiving information from at least one wireless network identifying other wireless networks from which selected portions of the downlink data flow can be received; and
sending information to a home agent of the client entity identifying the selected portion of the downlink data flow that is to be received from a corresponding wireless network.

19. The method according to claim 18, wherein said receiving at a client entity comprises receiving a first selected portion of the downlink data flow comprising a first group of data packets from a first wireless network, the first group of data packets comprising a first predetermined number of consecutively arranged data packets, and wherein said receiving at a client entity comprises receiving a second selected portion of the downlink data flow comprising a second group of data packets from a second wireless network, the second group of data packets comprising a second predetermined number of consecutively arranged data packets, and wherein said receiving at a client entity comprises receiving the first and second groups of data packets are alternatingly arranged in the downlink data flow, the method further comprising:
receiving in an alternating sequence at the client entity the first group of data packets and the second group of data packets.

20. The method according to claim 18, further comprising sending information from the client entity to a home agent of the client entity identifying the first and second predetermined numbers.

21. The method according to claim 18, wherein said receiving at a client entity comprises receiving a first selected portion of the downlink data flow comprising a first group of data packets received from a first wireless network, the first group of data packets comprising a first predetermined range of data packet sizes, and
wherein a second selected portion of the downlink data flow comprises a second group of data packets received from a second wireless network, the second group of data packets comprising a second predetermined range of data packet sizes.

22. The method according to claim 21, wherein said receiving at a client entity comprises receiving the first predetermined range of packet sizes such that the first predetermined range of packet sizes does not overlap with the second predetermined range of packet sizes.

23. The method according to claim 21, wherein said receiving at a client entity comprises receiving the first predetermined range of packet sizes such that the first predetermined range of packet sizes overlaps at least a portion of the second predetermined range of packet sizes.

24. The method according to claim 21, wherein said receiving at a client entity comprises receiving the first predetermined range of packet sizes comprising packet sizes having an odd size, and wherein said receiving at a client entity comprises receiving the second predetermined range of packet sizes comprising packet sizes having an even size.

25. The method according to claim 21, further comprising sending information from the client entity to a home agent of the client entity identifying the first and second predetermined ranges of packet sizes.

26. The method according to claim 18, further comprising displaying at least a portion of the downlink data flow on a touchscreen display, the touchscreen display being configured to be controlled by a stylus, at least one finger, or a combination thereof.

27. The method according to claim 18, further comprising sending from the client entity selected portions of an uplink data flow to at least two correspondingly different wireless networks of the plurality of wireless networks, the uplink data flow comprising a single uplink data flow associated with the Internet-Protocol-based services application.

* * * * *